United States Patent [19]
Gurvich et al.

[11] Patent Number: 5,554,350
[45] Date of Patent: Sep. 10, 1996

[54] AIR POLLUTION CONTROL AND HEAT RECOVERY SYSTEM AND PROCESS FOR COAL FIRED POWER PLANT

[75] Inventors: Boris Gurvich, West Hartford; Mark Palkes, Glastonbury, both of Conn.; James D. Wesnor, Birmingham, Ala.

[73] Assignee: Combustion Engineering, Inc., Windsor, Conn.

[21] Appl. No.: 356,666

[22] Filed: Dec. 15, 1994

[51] Int. Cl.$^6$ ............................. C01B 17/90; C01B 21/46
[52] U.S. Cl. ................................. 423/239.1; 423/242.1; 423/522
[58] Field of Search ................. 423/239.1, 242.1, 423/244.01, 244.09, 385, 522, 533, 539, 580.1

[56] References Cited

U.S. PATENT DOCUMENTS

| | | | |
|---|---|---|---|
| 4,470,449 | 9/1984 | Ziebold | 165/1 |
| 5,424,044 | 6/1995 | Kalka | 422/171 |

OTHER PUBLICATIONS

"A Capital and Operating Cost Evaluation of the SNOX Process", by D. C. Borio and D. J. Collins, Mar. 1994, Comparitive Econ. of Emerging Clean Coal Tech. III Conference pp. 1–10.

"Demonstrating the WSA–SNOX Process Through the CCT Program", by W. H. Kingston, S. Cunninghis, R. J. Evans and C. H. Speth, Oct. 1990 ASME/IEEE Power Generation Conference, pp. 1–9.

Olsen et al., "Unit Processes And Principles of Chemical Engeneering" pp. 1–3, 1932.

Kerms, "Process Heat Transfer" pp. 676–678, 1950.

*Primary Examiner*—David A. Simmons
*Assistant Examiner*—Linda L. Gray
*Attorney, Agent, or Firm*—Chilton, Alix & Van Kirk

[57] ABSTRACT

A coal fired power plant includes the catalytic reduction of $NO_x$ in the flue gas and the catalytic oxidation of $SO_2$ to $SO_3$ followed by the hydration of the $SO_3$ to $H_2SO_4$ vapor and then the condensation to $H_2SO_4$ liquid. The condensation takes place in a wet sulfuric acid condenser by heat exchange with incoming combustion air. A portion of the heat picked up by that combustion air is used to provide a portion of the heat for the condensate from the steam turbine. The combustion air is then fed to an air preheater and to the steam generator as primary and secondary combustion air.

3 Claims, 2 Drawing Sheets

AIR POLLUTION CONTROL AND HEAT RECOVERY SYSTEM AND PROCESS FOR COAL FIRED POWER PLANT

The present invention relates to an air pollution control process and system for the removal of nitrogen and sulfur oxides from power plant flue gas streams and particularly to the heat exchange and heat recovery within the air pollution control process.

BACKGROUND OF INVENTION

The current global emphasis on environmental protection and pollution abatement has fostered the development of a number of new technologies and processes focused on pollution control in the power production industry. Some of these new technologies represent significant improvements over the previous technologies in the areas of increased pollutant removal efficiencies, reduced reagent requirements, reduced waste streams and reduced operating costs.

One such system is comprised of a selective catalytic reduction (SCR) for the control of nitrogen oxides ($NO_x$) and sulfuric acid production for sulfur oxide ($SO_2$) removal. This system results in high efficiency $NO_x$ and $SO_2$ removal, minimal particulate emissions and no liquid or solid waste production. The system basically begins with some sort of particulate removal apparatus such as an electrostatic precipitator or appropriate filtering equipment. This is followed by a $NO_x$ reduction system which involves the selective catalytic reduction of the $NO_x$ to molecular nitrogen and water by reaction with ammonia ($NH_3$) and oxygen. Following the selective catalytic reduction of the $NO_x$, the process catalytically converts sulfur dioxide ($SO_2$) to sulfur trioxide ($SO_3$). The $SO_3$-containing flue gas stream is then cooled in a wet sulfuric acid condenser, by heat exchange with an air stream, to produce a concentrated sulfuric acid by-product stream. The cleaned flue gas is then ready for release to the atmosphere.

This process generates a considerable amount of recoverable heat in several ways. All of the reactions which take place with respect to $NO_x$ and $SO_2$ removal are exothermic and increase the temperature of the flue gas. These include the reaction of $NO_x$ and $NH_3$, $SO_2$ oxidation, $SO_3$ hydration to form sulfuric acid fume and condensation of the sulfuric acid. These heats of reaction plus any support heat which may have been added are recovered in the wet sulfuric acid condenser by cooling air. This heated air stream has typically been used for combustion air. A small percentage of the hot air has been used for system auxiliaries, such as ammonia evaporation and dilution, any support burner combustion air required and coal milling. However, the amount of air that is required for cooling in the wet sulfuric acid condenser is usually equal to or greater than the amount required for combustion and auxiliary purposes and/or is often at a higher temperature than desired for either the combustion air preheater or the primary air to the coal pulverizers.

SUMMARY OF THE INVENTION

The objective of the present invention is to provide a system and process for more effectively utilizing the available heat within an air pollution control system for a coal fired power plant. More particularly, the invention relates to a system and process wherein the flue gas $SO_2$ is converted to $SO_3$ and then hydrated and condensed to sulfuric acid by heat exchange with cooling air. A portion of the heat picked up by that cooling air is used to provide heat to the condensate from the steam turbine system as a part of the feedwater train and the cooling air is then fed to the air preheater as the combustion air for the coal fired steam generator.

DESCRIPTION OF THE PREFERRED EMBODIMENT

The present invention applies to an air pollution control system which includes the catalytic reduction of $NO_x$ and the catalytic oxidation of $SO_2$ to $SO_3$ followed by the hydration of the $SO_3$ to $H_2SO_4$. It then involves the condensation of the $H_2SO_4$ by cooling with air to produce concentrated sulfuric acid and a heated air stream. The process flow details of this system can be varied within the confines of the present invention and two such variations are shown in FIGS. 1 and 2 of the drawings.

Figure 1:
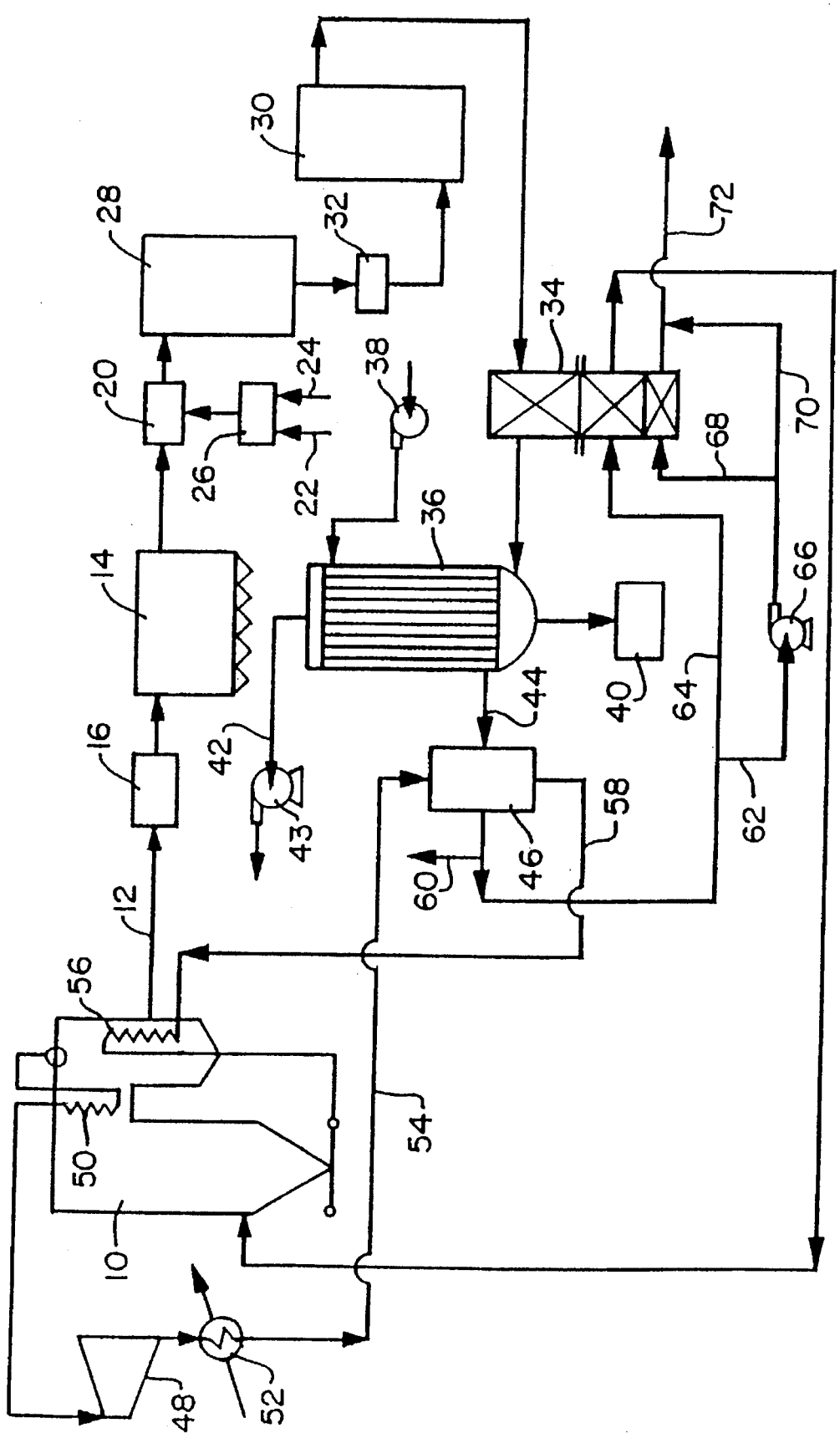
FIG. 1 is a flow diagram of one embodiment of the present invention wherein the $NO_x$ reactor precedes the combustion air preheater.
Figure 2:
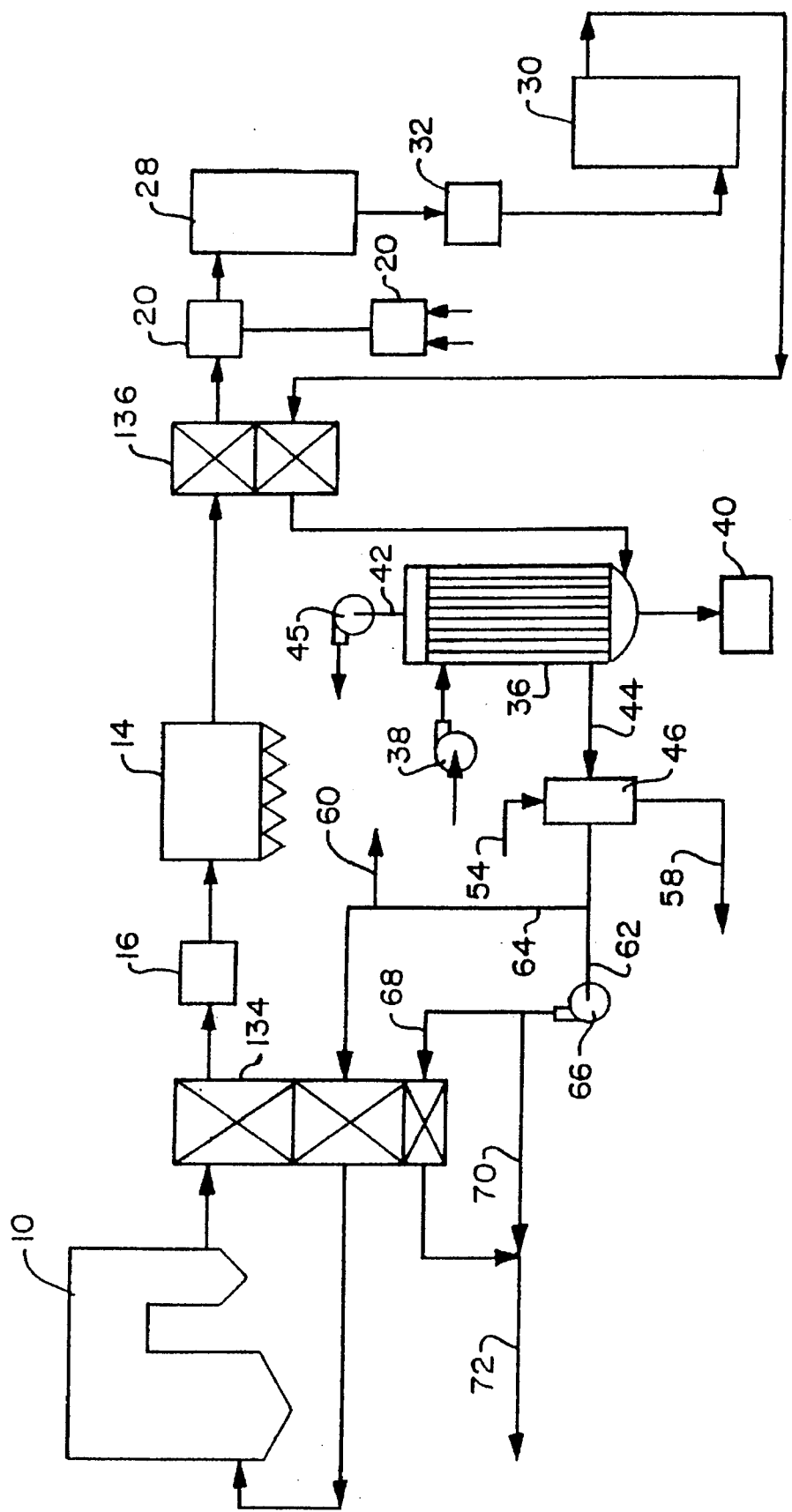
FIG. 2 is a flow diagram of another embodiment wherein the $NO_x$ reactor follows the combustion air preheater.

FIG. 1 relates to the system variation wherein the hot flue gas from the steam generator is processed in the $NO_x$ and $SO_2$ reactors before going to the combustion air preheater, while FIG. 2 illustrates a process variation wherein the hot flue gas is first cooled in the conventional combustion air preheater.

In the scheme shown in FIG. 1, the coal fired steam generator 10 generates a flue gas containing some quantity of $NO_x$ and $SO_x$, as well as particulate material. Most of the $NO_x$ is in the form of NO with only a small amount of $NO_2$. The $SO_x$ is mostly in the form of $SO_2$ with only small quantities of $SO_3$. This flue gas is passed through duct 12 to the particulate collection device 14 which may be any desired device for the conditions such as an electrostatic precipitator, a high temperature bag filter or any other suitable filter. During start-up of the system, it is usually necessary to provide auxiliary heat to the flue gas at 16.

The flue gas with the particulates removed is fed to the ammonia/flue gas mixing unit 20. The ammonia and air necessary for the catalytic reduction of $NO_x$ are fed at 22 and 24 respectively into the ammonia/air mixing unit 26 and then the ammonia/air mixture is fed to the mixing unit 20. The amounts of ammonia and air ($O_2$) that are added are determined by the reaction:

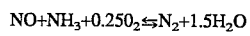
$$NO+NH_3+0.25O_2 \rightleftharpoons N_2+1.5H_2O$$

Any small amounts of $NO_2$ are similarly reduced. In prior art selective catalytic reduction systems, the molar ratio of $NH_3$ to $NO_x$ was limited to 1.0. This was necessary to limit unreacted $NH_3$ which might result in ammonium sulfate and bisulfate scaling in lower temperature areas downstream. However, in the present invention with the $SO_2$ oxidizer, small quantities of unreacted $NH_3$ are permissible since it is also oxidized. This allows stoichiometric ratios in excess of 1.0 and consequently higher $NO_x$ removal efficiencies. The ammonium salting will not occur between the $NO_x$ reactor and $SO_2$ reactor because the temperature is above the dew point. Even so, the excess $NH_3$ must be controlled and minimized since the oxidation of the excess $NH_3$ produces $NO_x$.

The ammonia/flue gas mixture from the mixing unit 20 in the temperature range of 340° to 400° C. and preferably at 370° C. (700° F.), is then fed into the selective catalytic reactor 28 containing the $NO_x$ reduction catalyst in which the above reaction is carried out. Preferably, this catalyst is a monolithic titanium dioxide based catalyst such as the Haldor Topsoe DNX catalyst. The $NO_x$ reduction process produces about 13.7 MJ/kg NO (5,880 BTU/lb. NO) of heat.

From the selective catalytic reactor 28, the flue gas goes to the $SO_2$ reactor 30. The flue gas temperature to this reactor is in the range of 370° to 430° C. and preferably 410° C. (770° F.). Therefore, it may be necessary to add heat to the flue gas at 32 such as by a natural gas trim burner. In this reactor 30, a conventional sulfuric acid catalyst oxidizes the $SO_2$ to $SO_3$ according to the reaction:

$$SO_2 + 0.5\ O_2 \leftrightharpoons SO_3$$

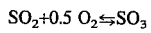

This reaction produces about 1.5 MJ/kg $SO_2$ (660 BTU/lb. $SO_2$) of heat. As previously indicated, the sulfuric acid catalyst oxidizes any excess $NH_3$ and also oxidizes most of the CO and remaining hydrocarbons present in the flue gas stream.

The flue gas leaving the $SO_2$ reactor 30 is at a temperature of about 370° to 430° C. and is next passed to the hot side of the gas-to-air heat exchanger 34 where heat is transferred to the incoming combustion air. The flue gas temperature is dropped about 170° C. (300° F.) to the range of 260° to 290° C. and the $SO_3$ is hydrated to sulfuric acid vapor with the attendant release of about 1.6 MJ/kg $SO_3$ (688 BTU/lb. $SO_2$). The cold end of the heat transfer surface in the heat exchanger 34 may need to be protected against corrosion due to presence of the sulfuric acid vapor. From the heat exchanger 34, the flue gas containing the sulfuric acid vapor is fed to the wet sulfuric acid tower 36 which uses ambient air supplied by the forced draft fan 38 as the cooling medium. As an example, this tower is preferably a tube and shell falling film condenser with the cooling air on the shell side and with borosilicate glass tubes used to convey and cool the flue gas to about 100° C. (212° F.) at the outlet. Virtually complete condensation and capture of the sulfuric acid at concentrations of 94 to 97 wt. % is possible. This condensation is also exothermic and releases about 1.1 MJ/kg $SO_2$ (460 BTU/lb. $SO_2$). The condensed sulfuric acid product is funneled through a trough at the bottom to the acid storage tank 40. The cleaned flue gas is discharged at 42 to the atmosphere through the induced draft fan 43.

The wet sulfuric acid condenser has, in effect, collected the heat released from the reactions in the selective catalytic reactor 28, the $SO_2$ converter 30, the hydration of $SO_3$, the condensation of $H_2SO_4$, the trim burner 32, the booster fan compression and the overall decrease in flue gas temperature.

The heated air 44 from the wet sulfuric acid condenser 36 is at about 200° C. (400° F.). The quantity of air required for the wet sulfuric acid tower may be greater than that required for combustion air and/or may be at a temperature higher than needed. In order to achieve the optimum heat recovery within the entire system encompassed by the coal fired power plant, this air should be cooled before it is passed to the boiler air preheater as combustion air. In the present invention, the hot air from the wet sulfuric acid condenser 36 is passed to condensate heat exchanger 46 which is any suitable type of gas-to-liquid heat exchanger.

In a conventional power plant, the condensate from the plant's low pressure turbine is passed through a series of condensate heaters which reheat the condensate from the low pressure turbine which is then passed back to the boiler's economizer. In FIG. 1, this is shown for illustration purposes by only a single turbine 48 connected to the superheater 50 of the steam generator. The condensate from the turbine 48 goes to the condensate heater 52 and then through line 54 to the condensate heat exchanger 46 of the present invention. The condensate heat exchanger 46 of the present invention, depending on the steam turbine heat balance, would be installed in parallel or in series with a plurality of these conventional condensate heaters 52. The reheated condensate is passed back to the economizer 56 in line 58. The condensate heat exchanger of the present invention replaces the heat duty of probably one or more of the conventional coal fired power plant's condensate heaters. Since those conventional condensate heaters normally used the turbine extraction steam for the heat source, the steam turbine is now capable of producing an additional power source, and this extraction steam is no longer needed. The air, upon exiting the air-to-condensate heat exchanger 46, proceeds to the heat exchanger 34 where heat is transferred from the flue gas to the combustion air. This heat exchanger 34 may be of any desired type, such as a tubular or rotary regenerative air preheater, or a no-leakage heat pipe heat exchanger. In a conventional power plant, the combustion air is preheated only in the flue gas-to-air heat exchanger. The air preheating duty in the present invention is first partially accomplished in the condenser 36, and then completed in the heat exchanger 34. As a result, the heat exchanger 34 is smaller then it would be for the conventional power plant. The combustion air from the heat exchanger 46 is split into primary combustion air 62 and secondary combustion air 64. The primary combustion air 62 passes through the primary air booster fan 66 passing through a section of the heat exchanger 34 and another portion 70 by-passing the heat exchanger 34 as tempering air to control the temperature of the air 72 which is fed to the coal pulverizer. The other portion of the combustion 64 is heated in the air preheater 34 and fed to the boiler as secondary combustion air. Also, if there is any excess air needed for the wet sulfuric acid condenser 36 above that needed for combustion air, the excess air can be used for firing natural gas in the trim burner 32, and/or in other heat recovery applications, or merely be vented at 60.

FIG. 2 of the drawings shows the present invention as applied when the flue gas from the boiler is first cooled in the combustion air preheater which is now designated 134. The cooled flue gas from the air preheater goes to the same type of start-up burner 16 and electrostatic precipitator 14 or other particulate removal system. Since the flue gas is at a significantly lower temperature at this point than in the version of the invention shown in FIG. 1, it is possible to use lower temperature particulate removal equipment such as bag house filters. From the precipitator, the flue gas goes to a gas-to-gas heat exchanger 136. Since the flue gas has been cooled in the air preheater 134, it is necessary to reheat this flue gas up to the temperature necessary for the selective catalytic reduction, 340° to 400° C., which is done in the gas-to-gas heat exchanger 136. From that point, the flue gas follows the same process steps as in FIG. 1 through the ammonia/flue gas mixing unit 20, the selective catalytic reactor 28, the trim heater 32 and the $SO_2$ reactor 30. The treated flue gas then goes to the gas-to-gas heat exchanger 136 where heat is transferred from the exiting flue gas to the entering flue gas. The flue gas temperature is dropped to the range of 260° to 290° C. and the $SO_3$ is hydrated to sulfuric acid vapor just as in the heat exchanger 34 in FIG. 1. The flue gas containing the sulfuric acid vapor then goes to the wet sulfuric acid condenser 36 which is operated in the same manner as in the FIG. 1 embodiment to condense the sulfuric acid and produce heated combustion air.

The heated combustion air 44 from the wet sulfuric acid condenser 36 now goes to the condensate heat exchanger 46 which also operates just as in the FIG. 1 embodiment. The combustion air from the condensate heat exchanger proceeds to the combustion air preheater 134 where heat is transferred from the flue gas to the combustion air. Once again, if there is any excess air needed for the wet sulfuric acid condenser 36 above that needed for combustion air, the excess air can be used for firing natural gas in the trim burner 32, and/or in other heat recovery applications, or merely be vented at 60. Also, the combustion air is split between primary and secondary combustion air and a portion of the primary air can by-pass the air preheater as tempering air for the coal pulverizers.

We claim:

1. In a process of operating a coal fired steam generator system in which a flue gas stream is produced containing $NO_x$ and $SO_2$ and in which steam is produced and in which steam is condensed to form condensed steam, the process of removing said $NO_x$ and $SO_2$ from said flue gas stream and of heating said condensed steam comprising the steps of:

a. catalytically reducing said $NO_x$ in said flue gas stream with a reductant to produce $N_2$, $H_2O$, and a flue gas stream removed of $NO_x$;

b. oxidizing $SO_2$ in said flue gas stream removed of $NO_x$ to $SO_3$;

c. hydrating said $SO_3$ in said flue gas stream containing said $SO_3$ to $H_2SO_4$ vapor;

d. passing said flue gas stream containing said $H_2SO_4$ vapor into heat exchange contact with a combustion air stream whereby said $H_2SO_4$ vapor is condensed and said combustion air stream is heated;

e. passing said heated combustion air stream into heat exchange contact with said condensed steam whereby said condensed steam is heated and said combustion air stream is cooled;

f. passing said cooled combustion air stream into heat exchange contact with any of said flue gas streams whereby said combustion air stream is further heated and said flue gas stream is cooled;

g. passing said heated condensed steam back to said steam generator; and h. passing said further heated combustion air stream to said steam generator as combustion air.

2. A process as recited in claim 1, wherein said step (f) of passing said cooled combustion air stream into heat exchange contact with any of said flue gas streams comprises heat exchange contact with said flue gas stream prior to said catalytic reduction of $NO_x$ and further including reheating said flue gas stream prior to said catalytic reduction of $NO_x$ by heat exchange contact with said flue gas stream after $SO_2$ oxidation and prior to $H_2SO_4$ vapor condensation.

3. A process as recited in claim 1, wherein said step (f) of passing said cooled combustion air stream into heat exchange contact with any of said flue gas streams comprises heat exchange contact with said flue gas stream after said $SO_2$ oxidation and prior to said $H_2SO_4$ vapor condensation.

* * * * *